United States Patent
Kobayashi (10) Patent No.: US 6,822,411 B2
(45) Date of Patent: Nov. 23, 2004

(54) METHOD AND APPARATUS FOR CONTROLLING MOTORS

(75) Inventor: Nobutsune Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 10/256,134

(22) Filed: Sep. 27, 2002

(65) Prior Publication Data

US 2003/0062867 A1 Apr. 3, 2003

(30) Foreign Application Priority Data

Oct. 1, 2001 (JP) ...................................... 2001-305695

(51) Int. Cl.$^7$ ............................................. G05B 11/01
(52) U.S. Cl. ........................ 318/560; 318/270; 318/271; 318/610; 388/806
(58) Field of Search ................................. 318/560, 271, 318/610, 600, 603, 651, 652; 388/806

(56) References Cited

U.S. PATENT DOCUMENTS

| | | | | |
|---|---|---|---|---|
| 3,742,326 A | * | 6/1973 | Okuda et al. ............... | 318/603 |
| 4,109,185 A | * | 8/1978 | Froyd et al. ................ | 318/571 |
| 4,287,461 A | * | 9/1981 | Promis et al. .............. | 318/571 |
| 4,751,984 A | * | 6/1988 | Williams et al. ............ | 187/293 |
| 4,796,112 A | * | 1/1989 | Mizukami et al. ........ | 360/78.07 |
| 5,111,349 A | * | 5/1992 | Moon ....................... | 360/78.07 |
| 5,198,909 A | * | 3/1993 | Ogiwara et al. ............ | 358/412 |
| 5,485,065 A | * | 1/1996 | Kaneko et al. ............. | 318/270 |
| 6,031,801 A | * | 2/2000 | Ishikawa et al. ......... | 369/47.24 |
| 6,139,205 A | * | 10/2000 | Suzuki et al. ................ | 400/76 |

FOREIGN PATENT DOCUMENTS

JP          2001-63168          3/2001

\* cited by examiner

*Primary Examiner*—Rita Leykin
(74) *Attorney, Agent, or Firm*—Fitzpatrick, Cella, Harper & Scinto (57) ABSTRACT

Control of a motor in a device in which a mechanism is driven using the motor as the power source is achieved by providing velocity servo-control means for outputting first command information regarding the motor based upon a preset velocity profile and information relating to velocity of the mechanism, and position servo-control means for outputting second command information regarding the motor based upon a preset position profile and information relating to position of the mechanism. A motor driving signal is generated, based upon the first and second command information, in a region in which the mechanism is to be accelerated in the velocity profile. As a result, target-velocity attainment time is shortened and velocity fluctuation after attainment of the target velocity is reduced.

9 Claims, 9 Drawing Sheets

METHOD AND APPARATUS FOR CONTROLLING MOTORS

FIELD OF THE INVENTION

The present invention relates to a method and apparatus for controlling a motor and, more particularly, to control executed when a mechanism is driven using a motor as a power source.

BACKGROUND OF THE INVENTION

Currently, motors are used as power sources of various apparatuses. Especially, many OA devices and home electric appliances use DC motors because they have simple structures, require no maintenance, generate little rotation variation and vibration, and are capable of high-speed operation and accurate control.

In recent years, printers, and especially general commercial printers that are often for home use, are required to have not only higher image quality but also lower operation noise. Noise generated in operation includes that generated in printing and that generated in driving mechanical portions. In inkjet printing apparatuses which have only a few noise sources in printing, noise generated in driving mechanical portions is reduced.

An inkjet printing apparatus has, as its main mechanical portions, a printhead scanning mechanism and a printing medium convey mechanism. Noise is reduced by using a DC motor and linear encoder as a driving means for the printhead scanning mechanism. Today, a DC motor and rotary encoder are also being employed as a driving means for the printing medium convey mechanism in many cases.

From the viewpoint of noise reduction, an effect can be expected when a DC motor is employed. From the viewpoint of accurate printing medium conveyance, more advanced position control is required in addition to a mechanical accuracy.

In an inkjet printing apparatus, the printhead is mounted on a carriage, which is driven by a motor. By way of example, control of the motor can be divided broadly into three control regions, namely an acceleration control region, a constant-velocity control region and a deceleration control region. In general, the printing operation is performed in the constant-velocity control region in order to assure image quality by holding the ink ejection interval constant. Though there are also systems in which printing is carried out also in the acceleration and deceleration control regions in order to raise printing speed, in all cases it is desired that any fluctuation in carriage velocity be made as small as possible during execution of printing. Accordingly, velocity servo control is suited as the feedback control method in the period during which printing is performed, i.e., in the constant-velocity control region. The reason for this is that velocity servo control is feedback control the aim of which is to make the velocity of the controlled system at a certain time coincide with a target velocity.

The specification of Japanese Patent Application Laid-Open No. 2001-63168 describes a motor control apparatus for performing stable control at the timing of a change from velocity control to position control. A conventional example of motor control, inclusive of the content set forth in the above specification, will now be described.

Figure 4:
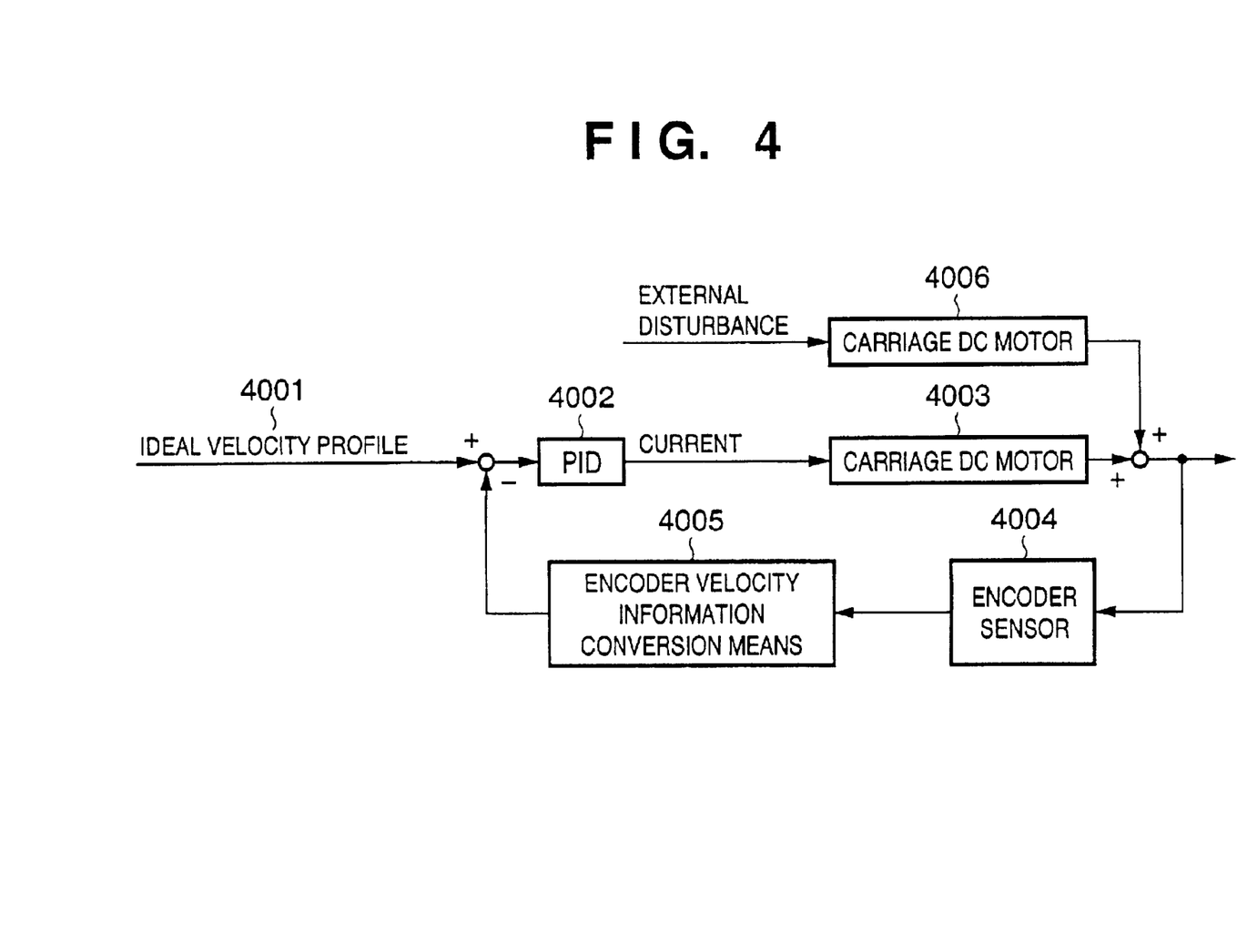
FIG. 4 is a block diagram illustrating a control procedure based upon ordinary velocity servo control.

FIG. 4 is a block diagram illustrating the ordinary feedback control procedure of a motor employing velocity servo control. Such velocity servo control is performed by a technique referred to as PID control or classical control. This procedure will now be set forth.

First, a target velocity desired to be imparted to a controlled system is applied in the form of an ideal velocity profile 4001. The profile provides velocity command values at applicable times. This velocity information changes with the passage of time. Drive is controlled by performing variable-value control with regard to the ideal velocity profile.

In velocity servo control, a PID operation generally is carried out. This is an operation involving a proportionality term P, an integration term I and a differentiation term D. The difference is found between encoder velocity information, which is obtained by encoder velocity information conversion means 4005 based upon information detected by an encoder sensor 4004, and the velocity command value obtained from the ideal velocity profile 4001. This numerical value is delivered to a PID arithmetic circuit 4002 as a velocity error, which is the velocity shortfall relative to the target velocity. Through a technique referred to as a PID operation, the PID arithmetic circuit 4002 calculates the energy that is to be applied to a DC motor 4003 at this time. Upon receiving this energy, the motor driver circuit regulates the current value by changing the duty of the applied voltage through, e.g., pulse-width modulation (PWM) control, thereby effecting velocity control by regulating the energy applied to the DC motor 4003.

The DC motor, which is rotated owing to application of the current value, rotates physically while being influenced by an external disturbance 4006. The output of the motor is fed back by being sensed by the encoder sensor 4004.

Figure 5:
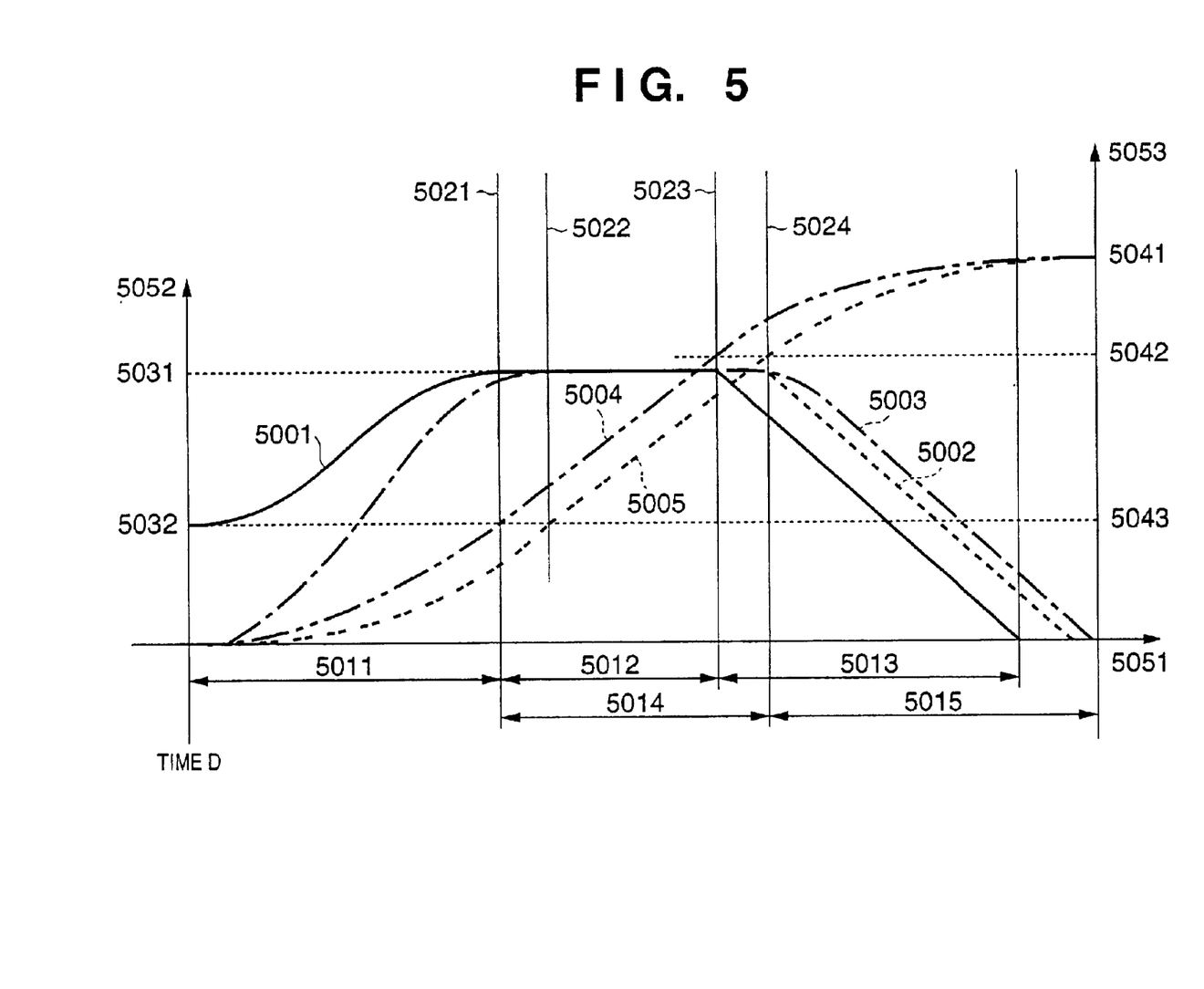
FIG. 5 is a graph illustrating an example of the relationship between time and both velocity and position in a case where a motor is driven by the velocity servo control of FIG. 4.

FIG. 5 is a graph illustrating an example of the relationship between time and both velocity and present position owing to the above-described control. In FIG. 5, time is plotted along a horizontal axis 5051, velocity along a vertical axis 5052 on the left side and position along a vertical axis 5053 on the right side.

With regard to position indicated along the vertical axis on the right side, numeral 5043 denotes the position at which printing starts and 5042 the position at which printing ends. The interval between points 5043 and 5042 represents the printing region. Numeral 5041 denotes an arrival position, namely the position eventually reached by rapid deceleration following the end of printing.

With regard to velocity indicated along the vertical axis on the left side, numeral 5031 denotes attainment velocity of the carriage sought in order to implement an ink ejection frequency desirable for printing. Numeral 5032 denotes the initial velocity in the ideal profile.

Further, the ideal velocity profile is indicated at 5001. This signifies the best velocity profile in which the printing region between the printing starting position 5043 and printing end position 5042 is traversed by the attainment velocity 5031, with the carriage coming to rest at the arrival position 5041 upon being promptly decelerated. The ideal velocity profile 5001 is composed of an acceleration control region 5011, an ideal constant-velocity control region 5012 and an ideal deceleration control region 5013 along the time axis.

Numeral 5004 denotes an ideal position profile, which indicates the transition of position in a case where drive is performed in accordance with the ideal velocity profile 5001. Time that passes through the printing starting position 5043 in the ideal position profile 5004 is an ideal time 5021 for starting printing. This generally indicates the ideal time at which constant-velocity control begins. Similarly, time that passes through the printing end position 5042 in the ideal position profile 5004 is an ideal time 5023 for ending printing. This generally indicates the ideal time at which deceleration control begins.

Numerals 5003 and 5005 denote actual velocity and actual position profiles, respectively. The actual velocity profile 5003 is composed of the acceleration control region 5011, an actual constant-velocity control region 5014 and an actual deceleration control region 5015 along the time axis.

If variable-value control is applied to the ideal velocity profile 5001 by the velocity servo control described in FIG. 4, the actual velocity will always follow up the ideal velocity with a certain delay. This means that even if the ideal time 5021 for starting printing arrives, the attainment velocity 5031 will not be reached and neither will the printing starting position 5043. The printing starting position 5043 is reached only when the actual time 5022 for starting printing arrives. During travel through the printing region from this point onward, constant-velocity control is required in order to suppress a fluctuation in velocity; hence, a transition to deceleration control is not allowed. As a result, the printing end position 5042 is reached after a delay similar to the delay involved in arriving at the printing starting position 5043. This moment in time is an actual time 5024 at which printing ends. This is the actual time at which deceleration control starts.

Numeral 5002 denotes an ideal velocity profile that has been re-calculated based upon the actual time 5024 at which deceleration control starts. Actual deceleration control is carried out by variable-value control with regard to the ideal velocity profile 5002.

With the control described above, however, the delay in time involved in reaching the printing starting position 5043 lengthens the time needed for overall control. As a consequence, time until the end of printing lengthens and the overall printing speed declines.

In order to solve this problem, consider a technique in which the above-described control is applied only to the regions from the constant-velocity control region onward and position servo control is applied to the acceleration control region. An instance where position servo control is applied to the acceleration control region in this technique will now be described.

Figure 6:
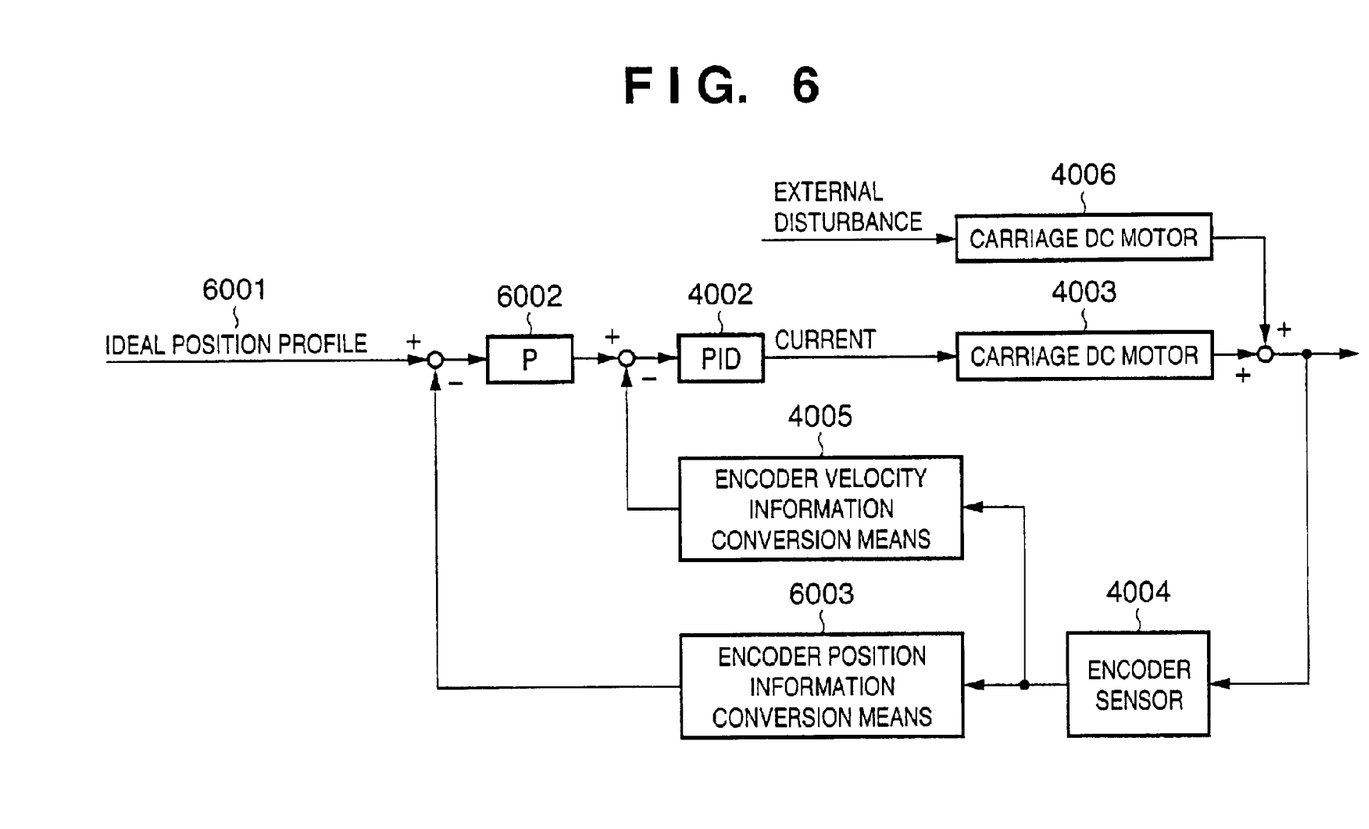
FIG. 6 is a block diagram illustrating a control procedure based upon ordinary position servo control.

FIG. 6 is a block diagram illustrating ordinary feedback control of a carriage motor using position servo control. Components in FIG. 6 identical with those shown in FIG. 4 are designated by like reference characters.

First, a target position desired to be imparted to a controlled system is applied in the form of an ideal position profile 6001. The profile provides position command values at applicable times. This position information changes with the passage of time. Drive is executed by performing variable-value control with regard to the ideal position profile.

The apparatus is provided with the encoder sensor 4004, which senses physical rotation of the motor. Encoder position information conversion means 6003 counts the number of slits sensed by the encoder sensor 4004 and obtains absolute-position information. The encoder velocity information conversion means 4005 calculates the actual driving velocity of the motor from the signal provided by the encoder sensor 4004 and a clock built in the printer.

A value that is the result of subtracting the actual physical position obtained by the encoder position information conversion means 6003 from the ideal position profile 6001 is delivered to subsequent position servo-control feedback processing (a major loop for position servo control) 6002 as a position error, which is the position shortfall relative to the target position. The major loop 6002 for position servo control generally is means for performing a calculation relating to the proportionality term P.

A velocity command value is output as the result of the calculation performed by the loop 6002. The velocity command value is delivered to velocity servo-control feedback processing starting with circuit 4002. In the minor loop for velocity servo control, generally the PID operation is performed, namely the operation involving the proportionality term P, integration term I and differentiation term D.

In the minor loop for velocity servo control, a numerical value that is the result of subtracting the encoder velocity information from the velocity command value is delivered to the PID arithmetic circuit 4002 as the velocity error, which is the velocity shortfall relative to the target velocity. Through the technique referred to as PID, the PID arithmetic circuit 4002 calculates the energy that is to be applied to a DC motor 4003 at this time. Upon receiving this energy, the motor driver circuit regulates the current value by changing the duty of the applied voltage through, e.g., PWM control, thereby implementing velocity control by regulating the energy applied to the DC motor 4003.

The DC motor, which is rotated owing to application of the current value, rotates physically while being influenced by the external disturbance 4006. The output of the motor is fed back by being sensed by the encoder sensor 4004.

Figure 7:
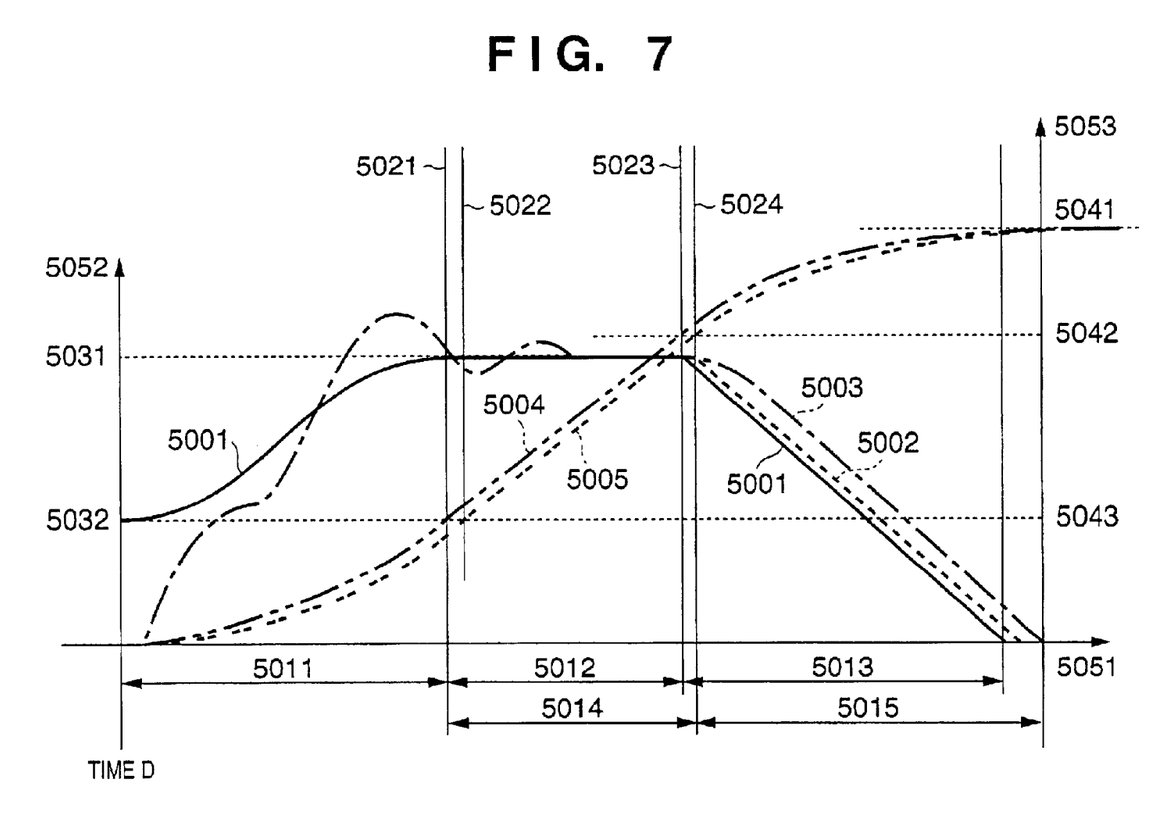
FIG. 7 is a graph illustrating an example of the relationship between time and both velocity and position for a case where position servo control shown in FIG. 6 is applied to the acceleration control region and velocity servo control shown in FIG. 4 is applied to the regions from the constant-velocity control region onward.

FIG. 7 is a graph illustrating an example of the relationship between time and both velocity and position in control for a case where position servo control shown in FIG. 6 is applied to the acceleration control region and velocity servo control shown in FIG. 4 is applied to the regions from the constant-velocity control region onward. Portions in FIG. 7 identical with those shown in FIG. 5 are designated by like reference characters.

In comparison with the example shown in FIG. 5, the actual position profile 5005 follows the ideal position profile 5004 in extremely accurate fashion, and the difference between the ideal time 5021 for starting printing and the actual time 5022 for starting printing is very small. This alleviates the aforementioned drawback encountered in velocity servo control, namely the fact that the delay in time involved in reaching the printing starting position 5043 lengthens the time needed for overall control, resulting in diminished printing speed overall.

If control is exercised in this manner, however, the following problem arises owing to execution of position servo control in the acceleration control region 5011:

Since precise control of velocity cannot be performed in the position servo-control interval, the occurrence of a fluctuation in velocity cannot be suppressed. As a consequence, it is not possible to control velocity at the moment of changeover from position servo control to velocity servo control, i.e., at the moment constant-velocity control starts, and velocity fluctuates even after the transition is made to the printing region. As a result, the driving frequency of the printhead cannot be held constant in the printing region, a variation occurs in the size of the ink drops ejected in an inkjet printer, and the original printing performance of the apparatus cannot manifest itself.

SUMMARY OF THE INVENTION

Accordingly, a first object of the present invention is to provide a motor control method through which target-velocity attainment time is shortened and velocity fluctuation reduced after the target velocity is attained.

A second object of the present invention is to provide a motor control apparatus through which target-velocity attainment time is shortened and velocity fluctuation after attainment of the target velocity is reduced.

According to the present invention, the first object is attained by providing a motor control method of controlling a motor in a device in which a mechanism is driven using the motor as a power source, comprising: a velocity servo-control step of outputting first command information regarding the motor based upon a preset velocity profile and information relating to velocity of the mechanism; a position servo-control step of outputting second command information regarding the motor based upon a preset position profile and information relating to position of the mechanism; and a driving signal generating step of generating a driving signal of the motor, based upon the first and second command information, in a region in which the mechanism is to be accelerated in the velocity profile.

According to the present invention, the second object is attained by providing an apparatus for controlling a motor in a device in which a mechanism is driven using the motor as a power source, comprising: velocity servo-control means for outputting first command information regarding the motor based upon a preset velocity profile and information relating to velocity of the mechanism; position servo-control means for outputting second command information regarding the motor based upon a preset position profile and information relating to position of the mechanism; and driving signal generating means for generating a driving signal of the motor, based upon the first and second command information, in a region in which the mechanism is to be accelerated in the velocity profile.

Thus, in accordance with the present invention, control of a motor in a device in which a mechanism is driven using the motor as the power source is achieved by providing velocity servo-control means for outputting first command information regarding the motor based upon a preset velocity profile and information relating to velocity of the mechanism, and position servo-control means for outputting second command information regarding the motor based upon a preset position profile and information relating to position of the mechanism, wherein a motor driving signal is generated, based upon the first and second command information, in a region in which the mechanism is to be accelerated in the velocity profile.

Adopting such an arrangement makes it possible to achieve motor control that incorporates both the advantage of position servo control, namely a short period of time until attainment of target position, and the advantage of velocity servo control, namely attainment of velocity target velocity in smooth fashion.

As a result, target-velocity attainment time is shortened and velocity fluctuation after attainment of the target velocity is reduced.

Preferably, the driving signal may be generated by multiplying the second command information by a coefficient that varies depending upon time.

Preferably, the coefficient takes on a maximum value at start of acceleration and a minimum value at end of acceleration.

The driving signal of the motor may be generated based upon the first command information alone in a region in which the mechanism is to be driven at a constant velocity in the velocity profile.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

A preferred embodiment of the present invention will now be described in detail in accordance with the accompanying drawings. The invention will be described taking as an example a serial inkjet printer on which a printhead having a removable ink tank is mounted. The inkjet printer according to this embodiment applies the motor control method of the present invention to control of a conveyance motor and carriage motor.

Figure 1:
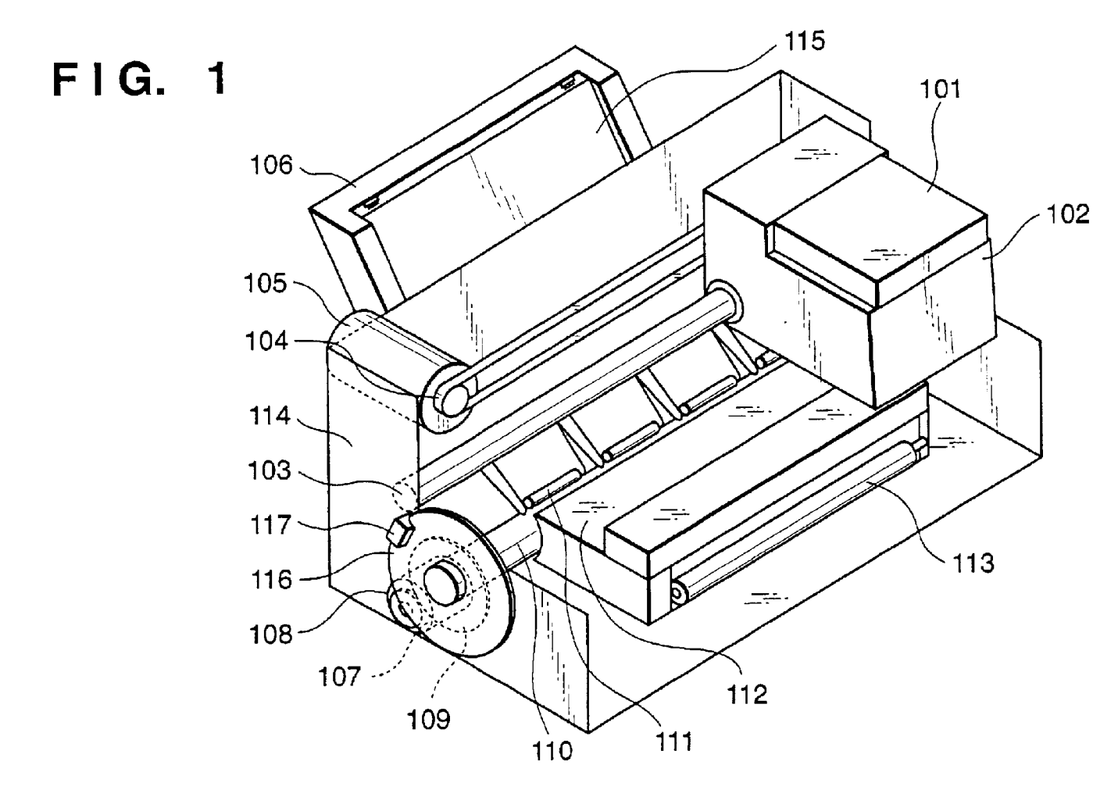
FIG. 1 is a perspective view showing the overall arrangement of a serial inkjet printer according to an embodiment of the present invention.

FIG. 1 is a perspective view showing the overall arrangement of the serial inkjet printer. Referring to FIG. 1, a printhead 101 has an ink tank. The printhead 101 is detachably mounted on a carriage 102. A guide shaft 103 is inserted to the bearing portion of the carriage 102 so as to be slidable in the main scanning direction. The two ends of the shaft are fixed to a chassis 114. A driving motor 105 serving as a carriage driving means transmits driving power through a belt 104 serving as a carriage drive transmission means engaged with the carriage 102 so that the carriage 102 can move in the main scanning direction.

In a printing standby state, printing paper sheets 115 are stacked on a feed base 106. At the start of printing, a printing paper sheet is fed by a feed roller (not shown). To convey the fed printing paper sheet, a convey roller is rotated by the driving force of a paper convey motor (107), i.e., a DC motor through a gear train (motor gear 108 and convey roller gear 109) serving as a transmission means. The printing paper sheet 115 is conveyed by an appropriate feed amount by a convey roller 110 and pinch rollers 111 that are pressed by the convey roller 110 and makes follow-up rotation. The convey amount is managed by detecting and counting, with an encoder sensor 117, slits of a code wheel (rotary encoder film 116) pressed and fitted into the convey roller gear 109. Hence, accurate feeding is possible.

Figure 2:
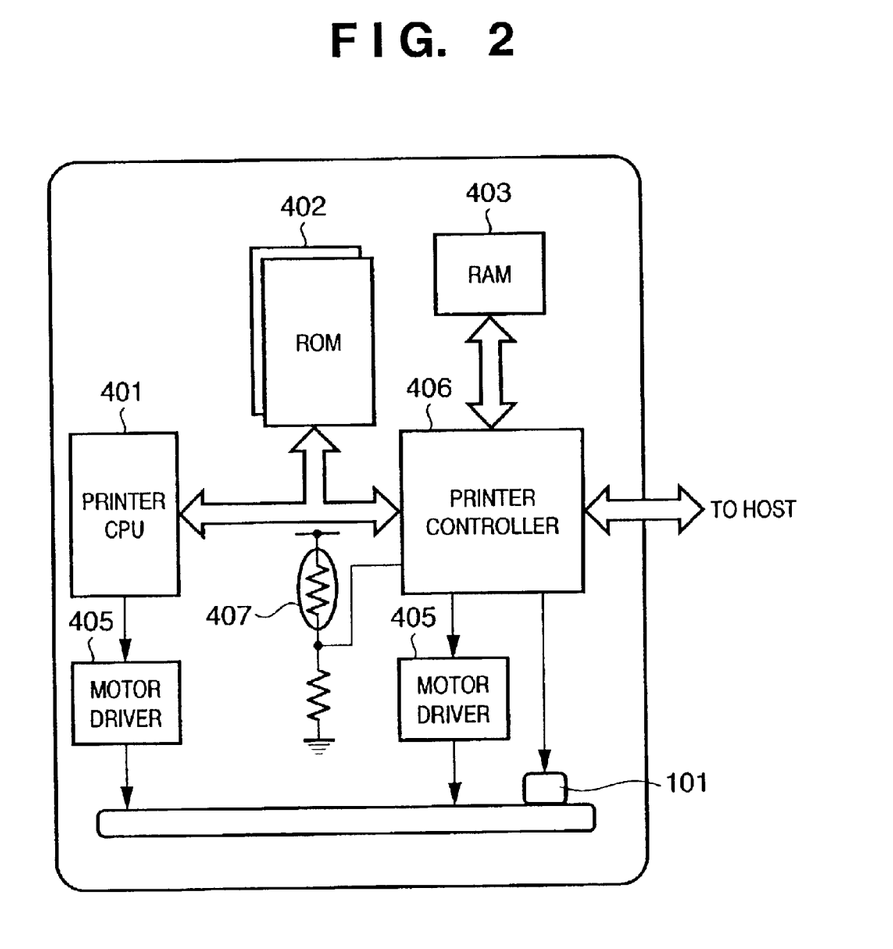
FIG. 2 is a block diagram for explaining the control arrangement of the printer shown in FIG. 1.

FIG. 2 is a block diagram for explaining the control arrangement of the printer shown in FIG. 1.

Referring to FIG. 2, reference numeral 401 denotes a CPU for controlling the printer of the printer apparatus. The CPU 401 controls printing processing using a printer control program stored in a ROM 402 or printer emulation and print fonts.

A RAM 403 stores rasterized data for printing or received data from a host. Reference numeral 404 denotes a printer head; and 405, a motor driver. A printer controller 406 controls access to the RAM 403, exchanges data with the host apparatus, and sends a control signal to the motor driver. A temperature sensor 407 formed from a thermistor or the like detects the temperature of the printer apparatus.

The CPU 401 reads out from the I/O data register in the printer controller 406 information such as an emulation command sent from the host apparatus to the printer apparatus and writes/reads control corresponding to the command in/from the I/O register and I/O port in the printer controller 406, while mechanically and electrically controlling the main body in accordance with the control program in the ROM 402.

Figure 3:
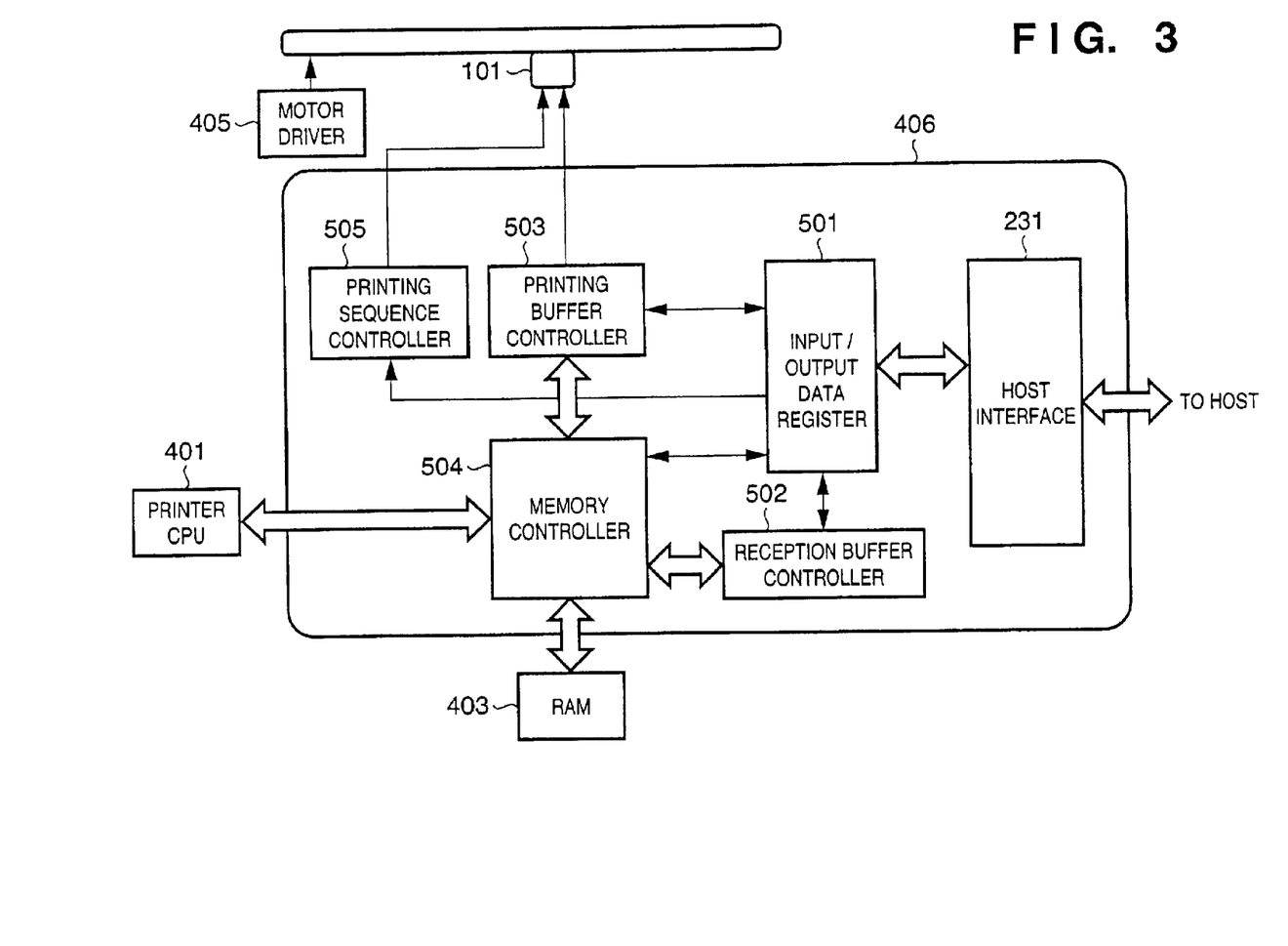
FIG. 3 is a block diagram for explaining the detailed arrangement of a printer controller shown in FIG. 2.

FIG. 3 is a block diagram for explaining the detailed arrangement of the printer controller 406 shown in FIG. 2. The same reference numerals as in FIG. 2 denote the same parts in FIG. 3.

Referring to FIG. 3, an I/O register 501 exchanges data with the host at the command level. A reception buffer controller 502 directly writes received data from the register in the RAM 403.

In printing, a printing buffer controller 503 reads out print data from the print data buffer of the RAM and sends the data to the printer head 404. A memory controller 504 controls three-directional memory access with respect to the RAM 403. A printing sequence controller 505 controls a printing sequence. A host interface 231 communicates with the host.

Figure 8:
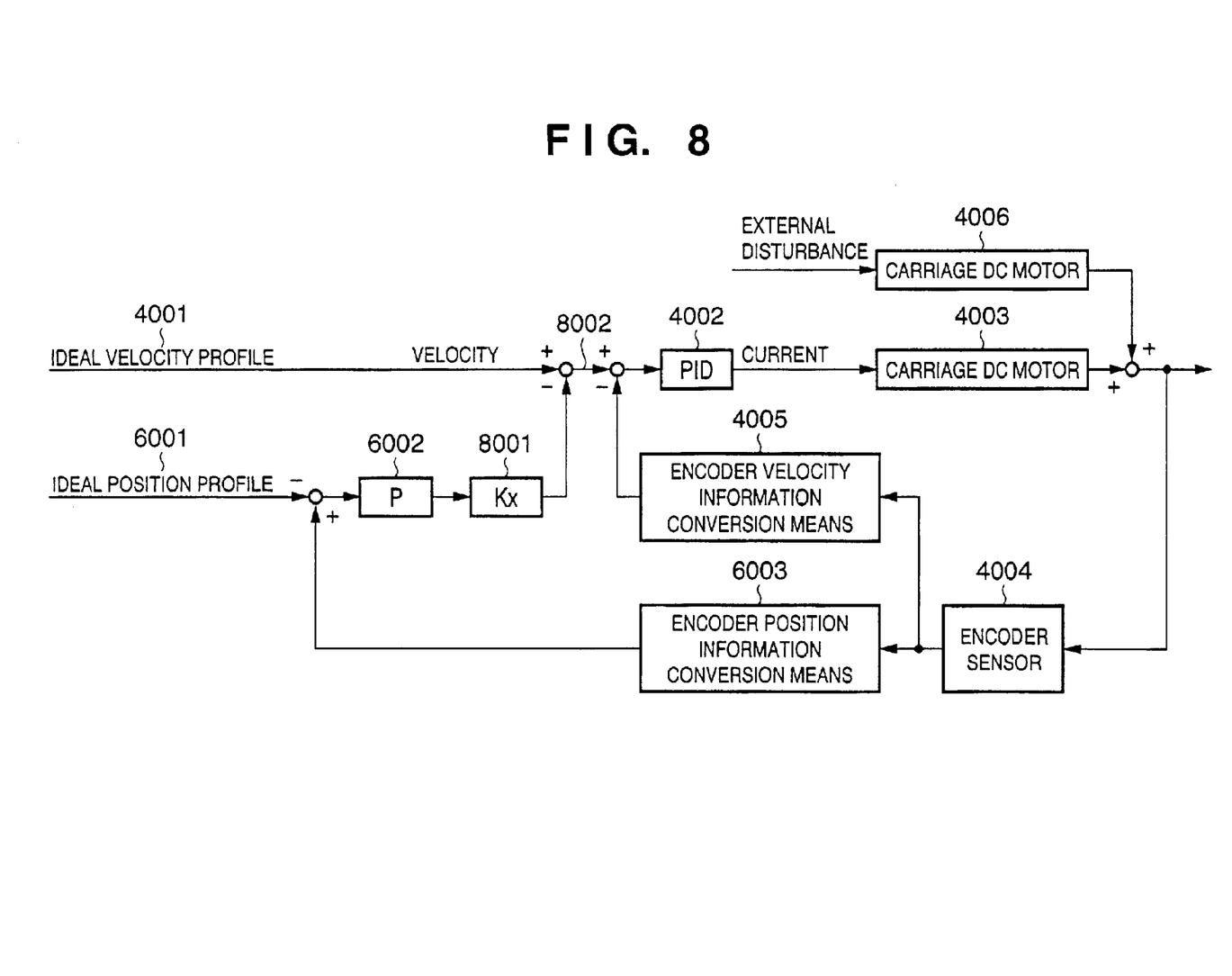
FIG. 8 is a block diagram illustrating a control procedure applied to the acceleration control region in an embodiment of the present invention.

FIG. 8 is a block diagram useful in describing control applied to the acceleration control region in this embodiment of the present invention. Portions in FIG. 8 identical with those shown in FIGS. 4 and 6 are designated by like reference characters.

First, a target position desired to be imparted to a controlled system is applied in the form of the ideal position profile 6001. The profile provides position command values at applicable times. This position information changes with the passage of time. Drive is executed by performing variable-value control with regard to the ideal position profile.

The apparatus is provided with the encoder sensor 4004, which senses physical rotation of the motor. The encoder position information conversion means 6003 counts the number of slits sensed by the encoder sensor 4004 and obtains absolute-position information. The encoder velocity information conversion means 4005 calculates the present driving velocity of the conveyance motor from the signal provided by the encoder sensor 4004 and a clock built in the printer.

A value that is the result of subtracting the ideal position profile 6001 from the actual physical position obtained by the encoder position information conversion means 6003 is delivered to position servo-control feedback processing from 6002 onward as a position error relative to the target position. The major loop 6002 for position servo control generally is means for performing a calculation relating to the proportionality term P. In this embodiment, multiplying means 8001 multiplies the output of the major loop 6002 by Kx, which is the output of a function having time as an input. The product that is the output of the multiplying means 8001 is subtracted from the ideal velocity profile 4001, as a result of which a command velocity 8002 is obtained. The value of the command velocity 8002 obtained by the above calculation has the meaning set forth below.

First, assume that the motor is being driven with absolutely no error relative to the ideal position profile 6001. In such case the output of the multiplying means 8001 is zero and, hence, the value of the command velocity 8002 is that of the ideal velocity profile 4001 per se.

In general, however, the actual arrival position involves a temporal delay with respect to the ideal position profile 6001 and therefore the output of the multiplying means 8001 has a negative value. As a result, the value of the command velocity 8002 exceeds the ideal velocity profile 4001.

In other words, a value for the purpose of following up the ideal position profile 6001 while preventing a drastic departure from the ideal velocity profile 4001 is output as the command velocity 8002, and the motor is driven by performing variable-value control with respect to the command velocity 8002.

In velocity servo control, the PID operation generally is performed, namely the operation involving the proportionality term P, integration term I and differentiation term D. The difference is found between the command velocity 8002 and the encoder information, which has been obtained by the encoder velocity information conversion means 4005 based upon the information detected by the encoder sensor 4004, this numerical value is delivered to the PID arithmetic circuit 4002 as a velocity error, which is the velocity shortfall relative to the target velocity, and the PID arithmetic circuit 4002 calculates the energy, which is to be applied to the DC motor 4003 at this time, through the PID calculation method. Upon receiving this energy, the motor driver circuit regulates the current value by changing the duty of the applied voltage through, e.g., PWM control, thereby implementing velocity control by regulating the energy applied to the DC motor 4003.

The DC motor 4003, which is rotated owing to application of the current value, rotates physically while being influenced by the external disturbance 4006. The output of the motor is fed back by being sensed by the encoder sensor 4004.

Figure 9:
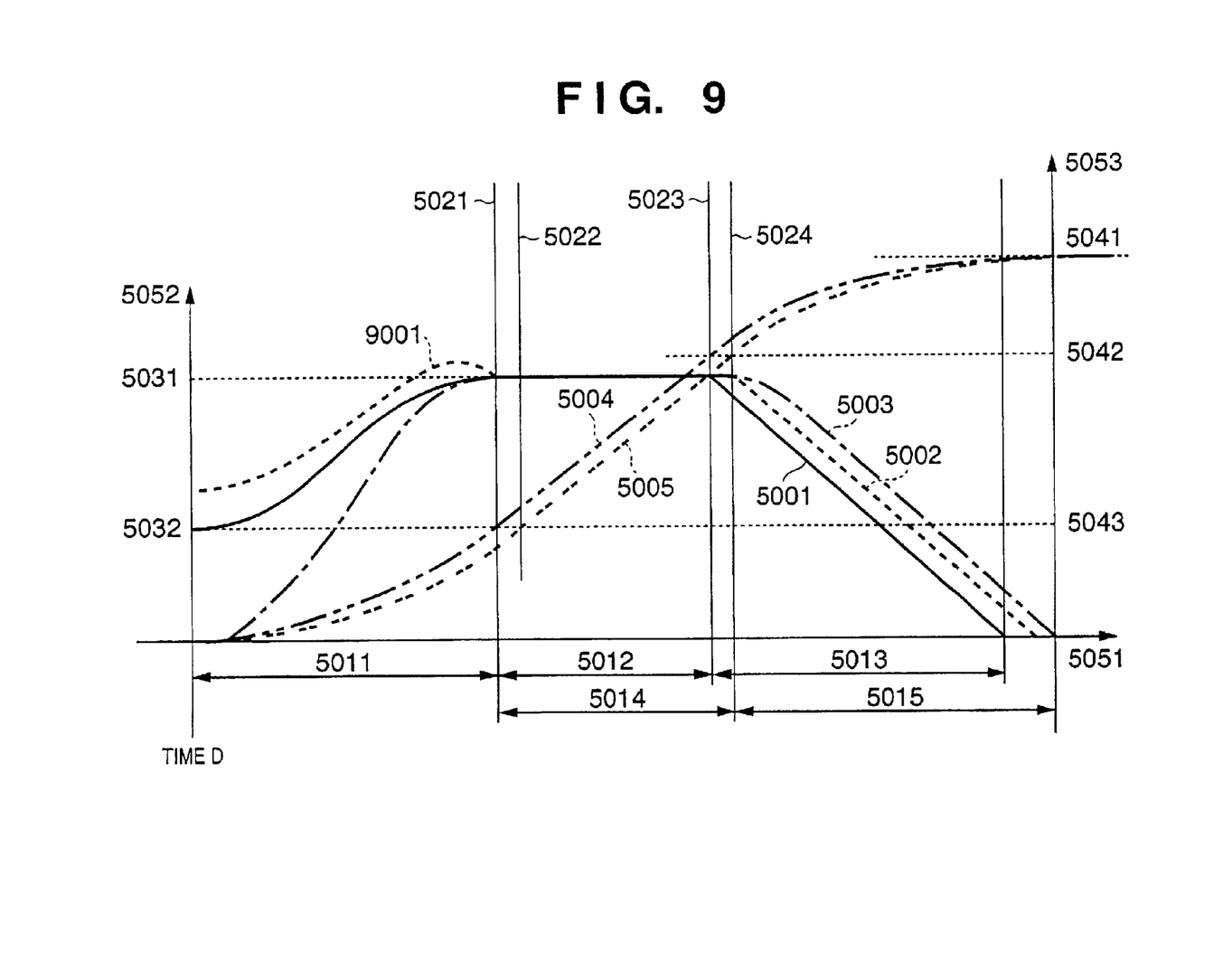
FIG. 9 is a graph illustrating an example of the relationship between time and both velocity and position for a case where the control shown in FIG. 8 is applied to the acceleration control region and the velocity servo control shown in FIG. 4 is applied to the regions from the constant-velocity control region onward.

FIG. 9 is a graph illustrating an example of the relationship between time and both velocity and position for a case where drive is controlled according to this embodiment. According to this embodiment, the control depicted in FIG. 8 is applied to the velocity control region, and the velocity servo control shown in FIG. 4 is applied to regions from the constant-velocity control region onward. Portions in FIG. 9 identical with those in the graphs of FIGS. 5 and 7 are designated by like reference characters. Further, the transition of the command velocity 8002 is indicated at 9001.

In comparison with the example shown in FIG. 5, the actual position profile 5005 follows the ideal position profile 5004 accurately and the difference between the ideal time 5021 for starting printing and the actual time 5022 for starting printing is very small. This alleviates the aforementioned drawback encountered in the example shown in FIG.

5, namely the fact that the delay in time involved in reaching the printing starting position 5043 lengthens the time needed for overall control, resulting in diminished printing speed overall.

In comparison with the example shown in FIG. 7, the advantages of velocity servo control can be attained even in the acceleration control region, as a result of which the occurrence of a fluctuation in velocity can be suppressed comparatively effectively. Accordingly, velocity at the moment of changeover from position servo control to velocity servo control, i.e., at the moment constant-velocity control starts, can be made more accurate, and it is possible to avoid a fluctuation in velocity after the transition is made to the printing region.

In order to obtain these advantages, however, the setting of the coefficient Kx in the multiplying means 8001 is important.

As a specific example of the setting of Kx, the setting can be made in accordance with the following equation:

$$Kx=K\times(Tflat-Tx)/Tflat$$

where K represents a constant, Tflat the time at which the acceleration control region 5011 ends, and Tx the present time.

More specifically, Kx takes on the maximum value at time 0 and becomes zero at the instant the acceleration control region 5011 ends. When Kx is zero, the output of the multiplying means 8001 becomes zero and therefore the command velocity 8002 becomes equal to the ideal velocity profile 4001. This means that control based upon velocity servo control exactly the same as that of FIG. 4 is carried out in the constant-velocity control region.

Accordingly, when the transition is made from the acceleration control region 5011 to the actual constant-velocity control region 5014, an extreme or sudden changeover of the control method does not occur and smooth control can be exercised as a result.

Further, since the gain of position servo control increases when acceleration control starts, good tracking of the ideal position control profile can be expected. As a result, the delay in terms of position in the initial phase of acceleration can be eliminated more effectively, and it is possible to perform position control that makes up for the temporal delay in control from the quiescent state to the moment at which motion begins.

Furthermore, toward the end of the acceleration control region, the gain of position servo control declines. As a result, velocity servo control becomes more efficacious and a fluctuation in velocity when the transition is made to the actual constant-velocity control region 5014 can be suppressed.

Other Embodiments

In the embodiment set forth above, the present invention is applied to control of a carriage motor in a serial inkjet printer. However, the present invention is not limited to an inkjet printer and can be applied to various devices that use motors.

Further, in the foregoing embodiment, the present invention is applied to control of a DC motor. However, the present invention can be applied also to motors other than DC motors so long as these motors can be subjected to feedback control such as the above-described variable-value control.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention also includes a case where an OS (operating system) or the like working on the computer performs parts or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As is apparent, many different embodiments of the present invention can be made without departing from the spirit and scope thereof, so it is to be understood that the invention is not limited to the specific embodiments thereof except as defined in the appended claims.

What is claimed is:

1. A method of controlling a motor by dividing the controlling into a plurality of regions including an acceleration region and a constant-velocity region in a device in which a mechanism is driven using the motor as a power source, comprising:

a command value output step of outputting a velocity command value by modifying a velocity command value defined in a preset velocity profile, based upon a preset position profile and information relating to position of the mechanism within the acceleration region;

a servo-control step of outputting command information regarding the motor based upon the velocity command value modified in said command value output step and information regarding velocity of the mechanism; and a driving signal generating step of generating a driving signal of the motor, based upon the command information, wherein in said command value output step, the velocity command value based upon the preset velocity profile is outputted within the constant-velocity region.

2. An apparatus for controlling a motor by dividing the controlling into a plurality of regions including an acceleration region and a constant-velocity region in a device in which a mechanism is driven using the motor as a power source, comprising:

command value output means for outputting a velocity command value by modifying a velocity command value defined in a a preset velocity profile, a preset position profile and information relating to position of the mechanism within the acceleration region;

servo control means for outputting command information regarding the motor based upon the velocity command value modified by said command value output means and information regarding velocity of the mechanism; and driving signal generating means for generating a driving signal of the motor, based upon the command information, wherein within the constant-velocity region, said command value output means outputs the velocity command value based upon the preset velocity profile.

3. The apparatus according to claim 2, wherein said command value output means includes multiplication means for multiplying by a coefficient that varies depending upon time.

4. The apparatus according to claim 3, wherein the coefficient takes on a maximum value at a start of the acceleration region and a minimum value at an end of the acceleration region.

5. A electronic device having a controller for controlling a motor by dividing the controlling into a plurality of regions including an acceleration region and a constant-velocity region that drives a mechanism in which the motor is used as a power source, said controller comprising:

command value output means for outputting a velocity command value by modifying a velocity command value defined in a preset velocity profile, based upon a preset position profile and information relating to position of the mechanism within the acceleration region;

servo control means for outputting command information regarding the motor based upon the velocity command value modified by said command value output means and information regarding velocity of the mechanism; and driving signal generating means for generating a driving signal of the motor, based upon the command information, wherein within the constant-velocity region, said command value output means outputs the velocity command value based upon the preset velocity profile.

6. A printer having an apparatus for controlling a motor by dividing the controlling into a plurality of regions including an acceleration region and a constant-velocity region that drives a carriage on which a printhead has been mounted, the motor being used as a power source, said apparatus comprising:

command value output means for outputting a velocity command value by modifying a velocity command value defined in a preset velocity profile, based upon a preset position profile and information relating to position of the mechanism within the acceleration region;

servo control means for outputting command information regarding the motor based upon the velocity command value modified by said command value output means and information regarding velocity of the mechanism; and driving signal generating means for generating a driving signal of the motor, based upon the command information, wherein within the constant-velocity region, said command value output means outputs the velocity command value based upon the preset velocity plane.

7. An apparatus for controlling a motor by dividing the controlling into a plurality of regions including an acceleration region in a device in which a mechanism is driven using the motor as a power source, comprising:

an encoder for outputting a signal in response to a movement of the mechanism;

velocity calculation means for calculating velocity information based on the signal outputted from said encoder;

position calculation means for calculating position information based on the signal outputted from said encoder;

difference calculation means for calculating a difference between a position command value defined in a position profile and the position information;

first operation means for performing an operation for obtaining a proportionality term relating to the difference calculated by said difference calculation means;

second operation means for performing an operation using a coefficient that decreases as time elapses;

modify means for modifying a velocity command value defined in a velocity profile by using a result of the operation performed by said second operation means;

energy calculation means for calculating electric energy to be supplied to the motor by performing PID operation using the velocity command value modified by said modify means and the velocity information calculated by said velocity calculation means; and drive means for driving the motor by outputting the electric energy calculated by said energy calculation means, wherein said coefficient becomes a predetermined value at the end of the acceleration region.

8. The apparatus according to claim 7, wherein said predetermined value is zero.

9. An apparatus for controlling a motor by dividing the controlling into a plurality of region including an acceleration region in a device in which a mechanism is driven using the motor as a power source comprising:

an encoder for outputting a signal in response to a movement of the mechanism;

velocity calculation means for calculating velocity information based on the signal outputted from said encoder;

position calculation means for calculating position information based on the signal outputted from said encoder;

first difference calculation means for calculating a difference between a position command value defined in a position profile and the position information;

operation means for performing an operation on the difference calculated by said first difference calculation means by using a coefficient that varies depending upon time;

second difference calculation means for modifying a velocity command value defined in a velocity profile by using a result of the operation performed by said operation means, and calculating a difference between the modified velocity command value and the velocity information calculated by said velocity calculation means, when controlling the motor within the acceleration region;

energy calculation means for calculating electric energy to be supplied to the motor by performing an predetermined operation on the difference calculated by said second difference calculation means; and drive means for driving the motor by outputting the electric energy calculated by said energy calculation means, wherein said second difference calculation means calculates the difference between the velocity command value defined in the velocity profile and the velocity information calculated by said velocity calculation means, when controlling the motor in a region other than the acceleration region.

* * * * *

UNITED STATES PATENT AND TRADEMARK OFFICE
CERTIFICATE OF CORRECTION

PATENT NO. : 6,822,411 B2
DATED : November 23, 2004
INVENTOR(S) : Nobutsune Kobayashi It is certified that error appears in the above-identified patent and that said Letters Patent is hereby corrected as shown below:

Column 10,
Line 56, "in a" should read -- in --.

Column 11,
Line 11, "A" should read -- An --.

Column 12,
Line 25, "region" should read -- regions --.
Line 53, "an" should read -- a --.

Signed and Sealed this

Tenth Day of May, 2005

JON W. DUDAS
*Director of the United States Patent and Trademark Office*